United States Patent Office 3,580,730
Patented May 25, 1971

---

3,580,730
DISCONTINUOUS POLYCARBONATE COATINGS
Thomas S. Grabowski, Vienna, W. Va., assignor to Borg-Warner Corporation, Chicago, Ill.
No Drawing. Filed June 12, 1968, Ser. No. 736,254
Int. Cl. B44d 1/44
U.S. Cl. 117—8
1 Claim

ABSTRACT OF THE DISCLOSURE

A method of providing a discontinuous polycarbonate coating on a thermoplastic substrate comprising the steps of dissolving a polycarbonate resin in a polycarbonate solvent, applying the resulting solution to a thermoplastic substrate, evaporating the solvent to form a continuous polycarbonate coating, and subsequently treating the coating with a developing solvent to form a discontinuous coating.

BACKGROUND

There have been a great variety of film type coating compositions and paintable compositions provided which utilize a variety of polymeric materials as the continuous surface therein. The compositions were normally provided with an aesthetic appearance through the use of a pigment, dye or the like that was added to change the hue or color of the coating composition. Normally, the coating surfaces were continuous, i.e., did not tend to shrink or expand and generally, the usefulness of the coating depended upon its dimensional stability. Coatings that lacked dimensional stability tended to crack and peel and failed to adhere to a given substrate. In specific instances, however, a discontinuous surface was intentionally obtained by utilizing coating compositions containing various additives.

SUMMARY OF THE INVENTION

The present invention is directed to a method of providing a thermoplastic substrate with a polycarbonate discontinuous coating that has excellent adhering qualities thereon comprising the steps of dissolving a polycarbonate resin in a polycarbonate solvent to provide a coating composition, applying the coating composition to a thermoplastic substrate and evaporating the solvent from said coating composition. The polycarbonate coating is thereafter contacted with a developing solvent (hereinafter defined) and the coating takes a discontinuous form. The solvent that is referred to as a "developing solvent" does not completely dissolve the polycarbonate and is utilized in swelling the polycarbonate resin. This solvent is meant to include aromatic solvents such as styrene, substituted styrenes, and the like, and aliphatic solvents such as ketones, alcohols, esters and the like as well as mixtures thereof. The "true solvents" for polycarbonates are solvents such as tetrahydrofuran and the partially halogenated hydrocarbons.

The discontinuous coating composition may be applied to virtually any thermoplastic substrate other than polycarbonate such as homopolymers, graft polymers or copolymers prepared from compounds such as butadiene, isoprene, styrene, alpha-methyl-styrene, methyl methacrylate, acrylonitrile, methacrylonitrile, ethyl acrylate, sulfonates, vinyl chloride, aromatic and aliphatic esters, olefins, mixtures thereof and the like. Polyesters, polysulfones, polysulfonates and polyphenylene oxides may also be used as the thermoplastic substrate. The dimensional changes that take place as the swelling solvent evaporates from the resin coating causes the coating to become discontinuous and the surface takes on a mottled or alligator finish. The aesthetic effects of the discontinuous coating may be changed by the addition of various dyes and/or pigments to the basic polycarbonate resin-solvent coating composition. It will be understood that the thermoplastic substrate to which the polycarbonate coating is applied may itself be applied to virtually any substrate such as wood, glass, asbestos board, fiber board, concrete, metal or even another thermoplastic material.

The specific polycarbonate resins that may be utilized in preparing the coatings of this invention are preferably the aromatic polycarbonates prepared by reacting bisphenols such as bisphenol-A (2,2-bis-(4-hydroxyphenyl)-propane) with phosgene; however, other substituted polycarbonates such as 2,2-bis-(3,5-dichloro-4-hydroxyphenyl)-propane may also be used to prepare the polycarbonates of this invention.

The specific solvents that may be utilized as well as the method, will be more clearly understood in view of the following examples in which all parts are by weight unless otherwise indicated.

EXAMPLE 1

A polycarbonate coating composition was prepared by dissolving 5.0 g. of polycarbonate in 100 g. of methylene chloride (a polycarbonate solvent). The coating was applied to a panel of acrylonitrile-butadiene-styrene graft polymer thermoplastic. The film that was formed was continuous and was developed into a discontinuous coating by applying methyl ethyl ketone (a developing solvent as defined herein) to the surface thereof.

EXAMPLE 2

A coating was prepared following the method of Example 1 except that tetrahydrofuran was utilized as the solvent in preparing the polycarbonate coating composition. The discontinuous coating was formed by applying methyl ethyl ketone thereon.

EXAMPLE 3

A polycarbonate coating composition was prepared by dissolving 5.0 g. of polycarbonate in 95.0 g. of methylene chloride. The coating was applied to an acrylonitrile-butadiene-styrene graft polymer sheet which in turn, was on a wood substrate. After the coating dried to a continuous polycarbonate film, methyl ethyl ketone was applied to the film and the film divided to form an alligator-type discontinuous coating.

The polycarbonate coating composition need not be prepared by use of one specific solvent and, as indicated above a combination of solvents may be used. For example, to form a true solution of polycarbonate, solvents such as methylene chloride, tetrahydrofuran, ethylene dichloride, chloroform, and 1,1,2,2-tetrachloroethane and the like may be used to form a continuous polycarbonate film; and developing solvents such as methyl ethyl ketone, cumene, xylene, styrene, α-chlorotoluene, methyl isobutyl ketone, ethyl acrylate, methyl acrylate, butyrol lactone, acetone, mixtures thereof and the like may be used to cause a discontinuous film to form after the polycarbonate solution has been applied to a given substrate. It will be understood that a portion of true solvent may be mixed with the developing solvent without adversely affecting the action of the developing solvent.

It will be understood from the examples that the invention has been described in connection with the application of developing solvents to a polycarbonate film. In all cases, discontinuous surface effects were obtained. The surfaces were varied over a wide range of discontinuity depending upon the solvent use. The size of the separate checked portions of coating as well as the space between the checked portions varies between a fine, evenly distributed checked surface to a coarse alligator type surface.

The invention has been described with respect to specific examples, however, the examples are meant to illustrate the invention and are not meant to limit the scope of the invention. The scope of the invention is defined solely by the appended claim which should be construed as broadly as is consistent with the prior art.

What is claimed is:

1. A method of preparing a discontinuous polycarbonate coating on a thermoplastic substrate comprising the steps of;

dissolving a polycarbonate resin in a solvent for said resin selected from the group consisting of methylene chloride, tetrahydrofuran, ethylene dichloride and chloroform, 1,1,2,2-tetrachloroethane;

applying said polycarbonate-solvent composition to said thermoplastic substrate in the form of a coating, removing the solvent from said coating and contacting said coating with a developing solvent selected from the group consisting of methyl ethyl ketone, methyl isobutyl ketone, methyl acrylate, butyrol lactone, xylene, cumene, styrene, alphachlorotoluene, acetone, ethyl acrylate, and mixtures thereof to thereby cause said coating to become discontinuous.

References Cited

UNITED STATES PATENTS

| | | | |
|---|---|---|---|
| 2,732,317 | 1/1956 | Kirby | 117—63 |
| 2,992,132 | 7/1961 | Melamed | 117—72 |
| 3,078,178 | 2/1963 | Ostberg | 117—63 |
| 3,190,766 | 6/1965 | Yuan | 117—10 |
| 3,208,875 | 9/1965 | Holden | 117—10 |
| 3,214,401 | 10/1965 | Butterworth | 117—161 |
| 3,243,993 | 3/1966 | Barton | 117—132X |
| 3,304,196 | 2/1967 | Deichert et al. | 117—161X |

WILLIAM D. MARTIN, Primary Examiner

M. R. P. PERRONE, Jr., Assistant Examiner

U.S. Cl. X.R.

117—37, 63, 72, 75, 132, 138.8, 148, 161